(No Model.)

N. H. EDGERTON.
ARMATURE FOR DYNAMO ELECTRIC MACHINES.

No. 432,748. Patented July 22, 1890.

WITNESSES:

INVENTOR,
Nathan H. Edgerton
By S J Van Stavorn
attorney

UNITED STATES PATENT OFFICE.

NATHAN H. EDGERTON, OF PHILADELPHIA, PENNSYLVANIA.

ARMATURE FOR DYNAMO-ELECTRIC MACHINES.

SPECIFICATION forming part of Letters Patent No. 432,748, dated July 22, 1890.

Application filed October 26, 1889. Serial No. 328,221. (No model.)

*To all whom it may concern:*

Be it known that I, NATHAN H. EDGERTON, a citizen of the United States, residing at Philadelphia, in the county of Philadelphia and State of Pennsylvania, have invented certain new and useful Improvements in Armatures for Dynamo-Electric Machines, of which the following is a specification.

My invention has relation to that form of armatures for dynamo-electric machines which have sectional cores and outer longitudinally or axially-wound helices or coils. Heretofore these armatures as mainly constructed comprise a core composed of plates or disks of iron with intervening disks of insulation, and suitable end caps mounted on the armature-shaft and helices or coils wound outside of said core lengthwise of the same.

My invention has for its object to dispense with said disks of metal or plates and substitute a more inexpensive form of sectional core which possesses all the practical advantages or functions of the disk form of the same; and to this end I preferably use flat strips of metal, which are preferably coiled lengthwise upon the armature-shaft and one upon another, and the ends of each coil are suitably fastened to the end caps of the core and the succeeding coils are suitably insulated from one another.

My invention accordingly consists of the combinations, constructions, and arrangements of parts comprising an armature for a dynamo-electric machine, as hereinafter more fully described in the specification, and pointed out in the claim.

Reference is had to the accompanying drawings, wherein—

Figure 1:
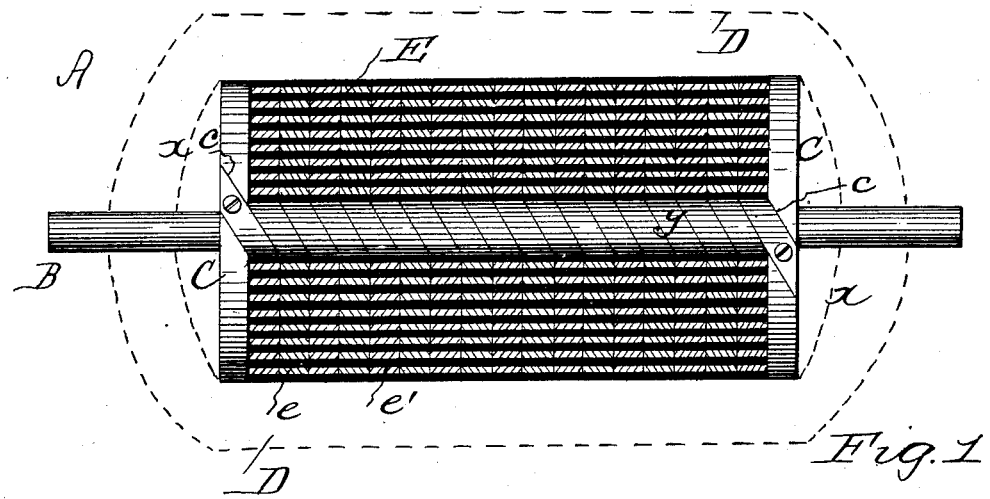
Figure 2:
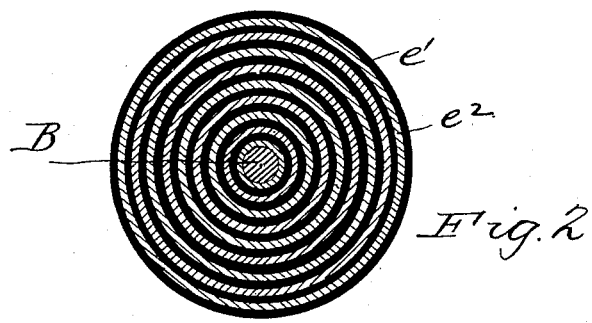
Figures 3, 4:
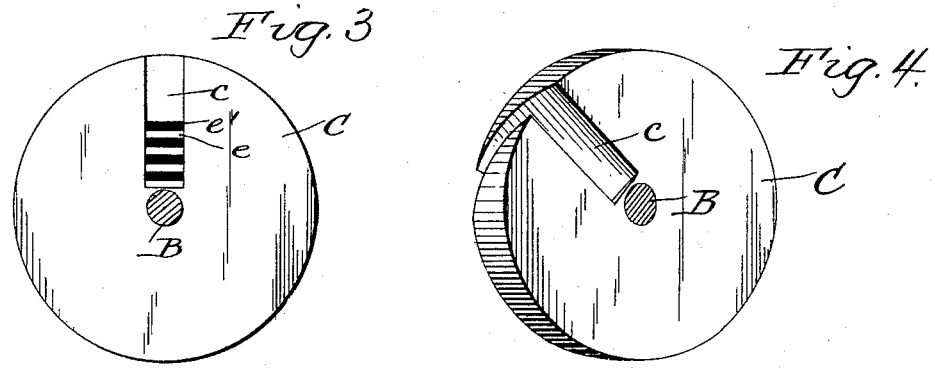

Figure 1 is a longitudinal section of an armature embodying my improvements. Fig. 2 is a transverse section of shaft and core therefor. Fig. 3 is an end elevation, partly sectional, of same, showing the core partly wound; and Fig. 4 is a perspective view, partly sectional, showing preferable form of end caps for the armature-core.

A represents the armature, composed of a shaft B, upon which are secured end caps C C, of disk form, flat on both sides, as shown in full lines of Fig. 1, or the outer side of said caps may be rounding, as indicated by dotted lines $x$ in said figure, for convenience of winding the helices or coils D. Each cap C is provided with a radial slot $c$, extending from near the shaft B to the periphery of the cap, and each slot has an angular or screw pitch from the inner side of the cap to the outer side of the same and away from or at an angle to the shaft B, as more plainly shown in Figs. 1 and 4, the slot $c$ in one cap having an opposite direction to that of the slot in the remaining cap; or the slots $c\ c$ in both caps are parallel to one another.

E represents the armature-core proper, and is composed of a number of coils $e$ of flat metal strips of any suitable width, which corresponds to the width of the slots $c$ in the caps C, and of intervening layers of insulation $e'$ between said coils $e$. To wind the latter one end of a strip or ribbon of metal is inserted in one of the cap-slots $c$, and is soldered, pinned, screwed, or otherwise permanently fastened to the cap. The shaft B is then rotated to wind or coil said ribbon in spiral form on the shaft, as indicated at $y$, Fig. 1, until said ribbon enters the slot $c$ of the other cap, whereupon the ribbon is cut and the cut end of the coil $e$ in said cap-slot is fastened therein, as above described. Each succeeding coil $e$ is correspondingly wound and its ends are fastened in the cap-slots until the core E is completed, suitable layers of insulation $e'$ being wrapped around each coil $e$ after it is wound and also around the shaft B, (see Fig. 2,) so as to insulate the latter from the armature-core and the coils from each other. After the core E is completed the helices or coils D are wound longitudinally of the core and exterior to it in the usual manner. If the ends C are of metal, they are suitably insulated from the shaft B.

From the foregoing it will be noted that each coil $e$ of core E is spirally wound from end to end of the core; that said coils connect the caps C, so that if desired no special form of fastenings to secure them to the shaft B, as is customarily done, need be used; that a pitch is given to the slots $c\ c$ in caps C for convenience of coiling the ribbon or flat-metal coils; that the pitch of said slots depends upon the width of the ribbon and its pitch of coiling; that corresponding windings of each successive coil $e$ are in line with or imposed upon one another, as more plainly indicated in Fig. 1, to form a series or number of concentric layers or coils from the center to the outside of the core, which coils are insulated from one another on their flat or wide surfaces and have edge contacts to provide a sectional armature-core without the usual disk-plates and yet possessing all the functions of the latter.

What I claim is—

In combination with a shaft provided with end caps, each having a radial slot extending from near the shaft to the periphery of the cap, each slot having an angular or screw pitch from the inner to the outer side of the cap and away from or at an angle to the shaft, of an armature-core composed of flat strips or ribbons of metal with insulation between each independent strip or ribbon, wound solid, flat, and spirally one upon another lengthwise of the shaft and of width correspondent to the width of the slots in the caps, the respective ends of the independent strips or ribbons and insulation seated in turn within the respective slots in the end caps and secured therein, substantially as set forth.

In testimony whereof I affix my signature in presence of two witnesses.

NATHAN H. EDGERTON.

Witnesses:
JOHN RODGERS,
S. J. VAN STAVOREN.